United States Patent

Hey et al.

[11] Patent Number: 5,281,763
[45] Date of Patent: Jan. 25, 1994

[54] CABLE BLOCKING

[75] Inventors: Stephen A. Hey, Taufkirchen; Axel Esser, Munich, both of Fed. Rep. of Germany; John A. Midgley, San Carlos, Calif.; Michael B. Sullivan, Palo Alto, Calif.; John W. Hoffman, Menlo Park, Calif.; David E. Barnwell, Highworth, England

[73] Assignee: Raychem GmbH, Fed. Rep. of Germany

[21] Appl. No.: 809,502

[22] PCT Filed: Jul. 3, 1990

[86] PCT No.: PCT/GB90/01023

§ 371 Date: Mar. 2, 1992

§ 102(e) Date: Mar. 2, 1992

[87] PCT Pub. No.: WO91/00601

PCT Pub. Date: Jan. 10, 1991

[30] Foreign Application Priority Data

Jul. 3, 1989 [GB] United Kingdom ............ 8915258

[51] Int. Cl.$^5$ ............................................ H02G 15/08
[52] U.S. Cl. .................................. 174/84 R; 174/22 R; 174/76; 174/88 R; 174/DIG. 8
[58] Field of Search ............ 174/84 R, 88 R, 76, 174/22 R, DIG. 8

[56] References Cited

U.S. PATENT DOCUMENTS

| 3,054,847 | 9/1962 | Colbert | 174/88 |
|---|---|---|---|
| 3,895,180 | 7/1975 | Plummer | 174/92 |
| 3,896,260 | 7/1975 | Plummer | 174/92 |
| 3,985,951 | 10/1976 | Harris | 174/84 R X |
| 3,992,569 | 11/1976 | Hankins et al. | 174/92 |
| 4,434,320 | 2/1984 | Klein et al. | 174/23 R |
| 4,496,795 | 1/1985 | Konnik | 174/84 R |
| 4,555,284 | 11/1985 | Quella et al. | 174/110 F |
| 4,589,939 | 5/1986 | Mohebban et al. | 174/88 R |
| 4,621,168 | 11/1986 | Bryant et al. | 174/88 C |
| 4,625,073 | 11/1986 | Breesch et al. | 174/72 R |
| 4,634,207 | 1/1987 | Debbaut | 174/76 |
| 4,741,940 | 5/1988 | Reed | 174/84 R X |
| 4,769,513 | 9/1988 | Ragland et al. | 174/23 R |
| 4,816,309 | 3/1989 | Hutt et al. | 174/DIG. 8 |

FOREIGN PATENT DOCUMENTS

| 0067009 | 12/1982 | European Pat. Off. |
|---|---|---|
| 0153174 | 8/1985 | European Pat. Off. |
| 0115220B1 | 6/1988 | European Pat. Off. |
| 2637058 | 2/1978 | Fed. Rep. of Germany |
| WO87/07779 | 12/1987 | PCT Int'l Appl. |
| 699421 | 11/1953 | United Kingdom |
| 967853 | 8/1964 | United Kingdom |
| 1177915 | 1/1970 | United Kingdom |
| 2019115A | 10/1979 | United Kingdom |
| 1568102 | 5/1980 | United Kingdom |
| 2099639 | 12/1982 | United Kingdom |
| 2100281A | 12/1982 | United Kingdom |
| 2168649 | 1/1986 | United Kingdom |

Primary Examiner—Morris H. Nimmo
Attorney, Agent, or Firm—Herbert G. Burkard; A. Stephen Zavell

[57] ABSTRACT

An electrical cable in-line or branch joint has hydrophobic material located around the connections of the conductors so as to act as a water block. The hydrophobic material is physically prevented from being forced away from the connections into the cables, for example by pressure of water within the cable, by a fibrous material located in and around the crutch regions where the conductors emerge from the cable joints.

16 Claims, 1 Drawing Sheet

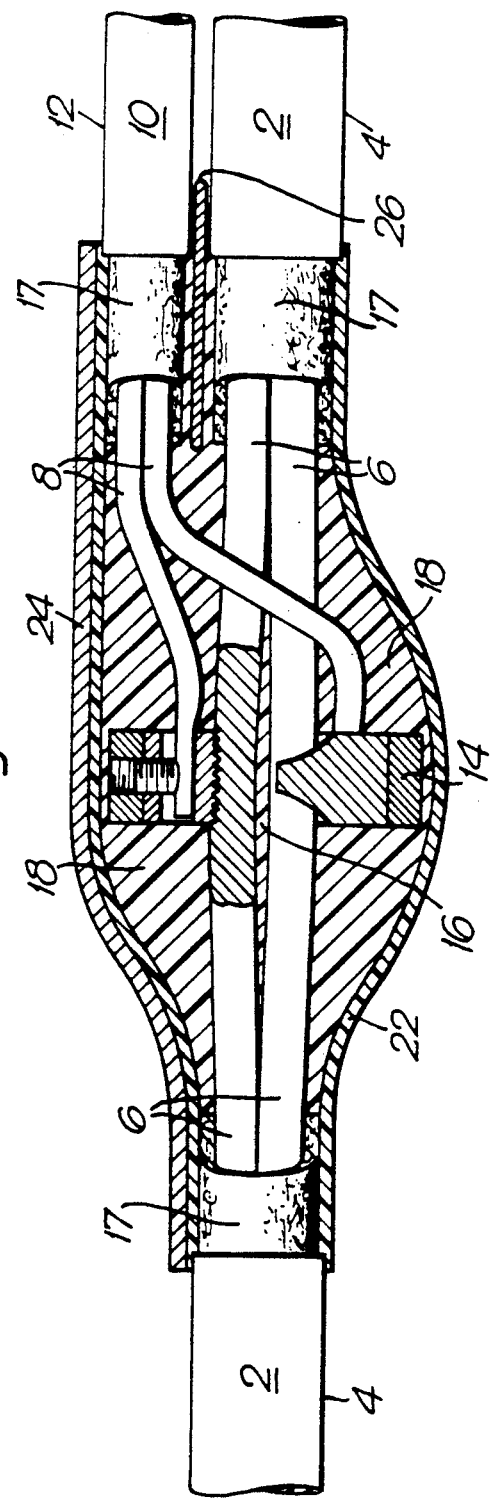
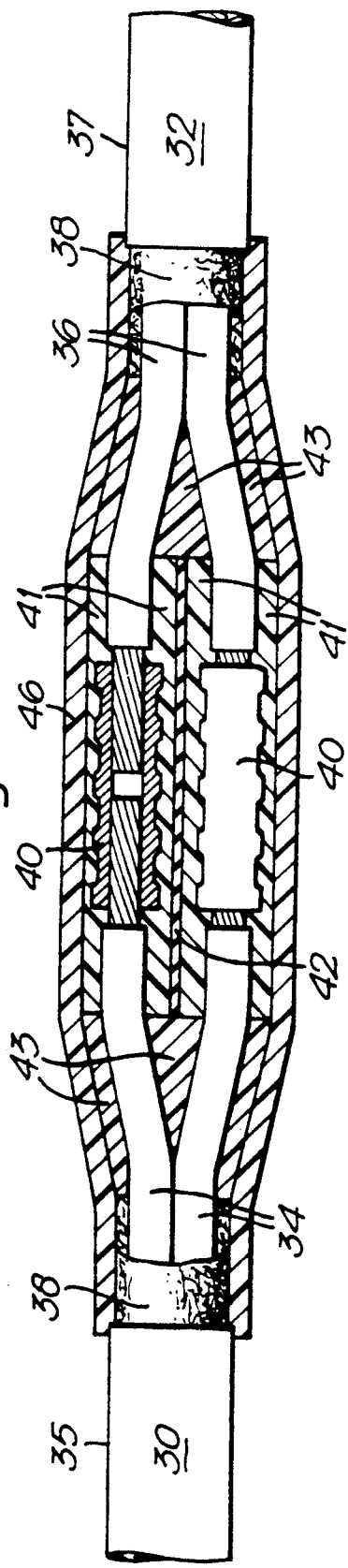

CABLE BLOCKING

This invention relates to a method of blocking an electric power cable joint against the ingress of water or other moisture, hereinafter referred to generally as "moisture", and to a moisture-blocked cable joint. The invention is particularly though not exclusively applicable to joints between multi-core cables, that is to say to cables containing at least two cores, and typically cables having either three or four cores, possibly with the addition of an earth core. The joint may be an in-line joint, between two cables, or it may be a branch joint, between two, three or more cables. In the case of a branch joint, the main cable may be unbroken and have a branch cable leading therefrom, or the joint may be between two main cables and a branch cable.

Modern electric power cables are usually made by the multi-extrusion of a plurality of cable components one on top of the other, including layers of polymeric insulation material around the individual conductor(s) thereby to form individual cable core(s), and also, in a multi-conductor cable, around the plurality of cores to form the complete cable. It is possible, for example due to damage to some of the outer components or layers of the cable, for moisture to enter the cable and to travel therealong between successive layers and/or cores. Such moisture in the cable can be particularly disadvantageous in the region of a cable joint where, in a multi-conductor cable for example, the outer, common layers of the cable are removed to expose the individual cores and where the insulation of the individual cores is removed, or at least disturbed, to allow connection between respective cores of two, or more, cables. In this region, the removal and/or disturbance of cable insulation inherently increases the electrical stress in comparison with its value elsewhere along the cable. The re-formed cable joint thus has to ensure that such stress is kept below a value that could cause damage or inhibit proper and safe operation of the jointed cable. The presence of water in this region inherently has the effect of increasing the electrical stress.

It is known from GB-A-2100281 to locate a hydrophobic filing composition around a plurality of connections of a telecommunications cable splice, to contain the filler within a polymeric wrapper and finally to enclose the splice with a recoverable polymeric sleeve. In GB-A-1177915, a non-hygroscopic, non-melting, water-repellant grease is urged by means of a heat-recoverable sleeve around a stranded conductor at a joint or termination of an electrical cable where the conductor emerges from insulation. Thus cable joints are known in which ingress of water from outside the cable is prevented.

It is one object of the present invention to provide an improved electric power cable joint, and a method of producing it, wherein the electrical stress is minimised by preventing substantially any moisture that may be in the cable from entering the joint region. This is acheived by blocking the cable joint against the flow of moisture along the cable, at the region where at least one outer layer, such as the cable jacket, has been removed in order to allow access to the core or to the individual cores for connection purposes.

Thus, in accordance with one aspect of the present invention there is provided a joint between electric power cables in which at least two cable cores are exposed beyond the ends of outer jackets of at least two cables and in which conductors of the two cores are electrically connected to each other, wherein sealing material that is substantially impervious to moisture is located around the cores so as to prevent any moisture reaching the electrical connections of the conductors; wherein blocking material is located within the joint so as to prevent the sealing material from migrating away from the connections into or around the cables; and wherein a protective sleeve encloses the cable connections and the sealing and blocking materials.

In accordance with another aspect of the present invention, there is provided a method of forming a moisture-blocked joint between at least two electric power cables; wherein outer jackets of the cables are removed to expose the cores thereof, and insulation of the cores is removed or disturbed for access to the conductors thereof; wherein electrical connection is made between the conductors of the cables; wherein sealing material that is substantially impervious to moisture is disposed around the cable cores so as to prevent any moisture reaching the electrical connections; wherein blocking material is located within the joint so as to prevent the sealing material from migrating away from the connections into or around the cables; and wherein a protective sleeve is positioned around the jointed cables so as to enclose the cable connections and the sealing and blocking materials.

The blocking material is thus arranged in accordance with the present invention specifically to prevent migration of the water-impervious sealing material along the cable itself. This is of particular importance in the case of multi-core cables, where paths that potentially could allow transmission of moisture inherently exist in the cable in the region between the cores. The cable blocking disclosed for example in the above-mentioned patent specifications is not effective in this area since it is applied only around the outside of a plurality of conductive elements.

Preferably the sealing material may be arranged within the joint such that it encapsulates, i.e. completely encloses the electrical connections between the cables. In this case, even if moisture should find its way to the inside of the protective sleeve, whether from within the cable itself or by flowing in between the cable and the sleeve, it will be prevented from reaching the electrical connections, which are electrically the most vulnerable parts of the joint. The electrical connections in the case of a branch joint may advantageously be made by a connector, such as a compact ring connector, of known configuration, and in the case of an in-line joint, the connections may be made by crimping. The sealing material can then completely encapsulate the branch or crimp connectors. Such positioning of the sealing material thus completely ensures that any moisture escaping into the joint between the conductors and the individual core insulation cannot form a conductive path in the connection region from one conductor core to another.

The sealing material, in the case of a multi-core cable, alternatively, or additionally, may be arranged so as to block ingress of moisture from within the cable by being located in the crutch region between the cores of the cables where the cores emerge from the cable jacket. A further quantity of sealing material may then advantageously be located around the cores at the crutch region adjacent each cable jacket.

It may well be sufficient that the blocking material merely extends axially between the sealing material and the crutch region or connection region as appropriate, or between the two or three portions of sealing material where the latter is located at the connection region and also at least one of the crutch regions. However, the blocking material may encapsulate the sealing material, and may extend completely across the joint, that is to say, it abuts or even overlaps the able jacket on each side of the joint, and is preferably sealed thereto. Preferably, the blocking material encapsulates the cable cores, between and around the cores, in the crutch region of multi-core cables.

The blocking and/or sealing material may be applied to the joint in the form of a tape or a sheet, or as a mastic or hot-melt adhesive.

Material, for example a sealant such as a mastic, that is impervious to moisture and that is suitable for use as the sealing material is known per se, as is its use in the moisture blocking of a cable, for example a telephone cable. However, in order to have a material that has sufficiently low viscosity to allow it to penetrate and seal completely the region between the three or four cores of a multi-core electrical power cable the material generally has to be non-curing or non-crosslinkable. The problem to be overcome here is that the material has be be hot (lower viscosity) in order to flow, but the cable cores are of relatively large cross-section (ranging from 1.5 $mm^2$ to 300 $mm^2$ or more, depending on the current rating of the cable), of highly thermally conductive material (usually copper or aluminium), and are close together. Thus the cores act as a very efficient heat sink. The material must not cool too much nor too quickly, nor cure, until the regions between, and around, the cores of the cable and/or the connections are substantially completely filled with the sealant. During thermal cycling of the cable in normal operation, the conductor temperature can reach as high as 95° C. At this temperature, and particularly under the influence of water pressure (which can be equivalent to a head of water of as much as 1 meter, or more) from within the cable, there is a tendency for the sealant to be physically driven away along the cable, thus allowing moisture to enter the electrically vulnerable region around the core connections, possibly leading to electrical breakdown of the cable. The problem is exacerbated by the fact that the cores of electric power cables are large and rigid (being of solid or stranded configuration), and by the requirement for making the cut-back length (and thus the exposed length of the cores) at the joint as short as possible. This means that the cores cannot be pulled far apart from each other for fear of damaging the cable jacket thus making it difficult to insert sealing material between the cores. The minimum cross-sectional area of each conductor of a low voltage electric power cable would be in the region of 6 $mm^2$, with a corresponding effective core diameter of about 4 mm, whilst typical dimensions for a 1 kV cable would be 150 $mm^2$ and 18 mm respectively. A typical 1 kV branch cable would have a conductor cross-section of about 50 $mm^2$ to 70 $mm^2$ and a core diameter of about 12 mm.

The moisture-, and especially water-, impervious sealing material, preferably being a mastic, is advantageously chosen for its ability to form a good bond both to polyvinylchloride and to polyethylene, these being the most common materials used as insulation for plastic insulated cables. The material may, however, not bond but may form the required moisture sealing by means of external pressure applied thereto. It is also advantageous that the sealing material bond to metals, such as aluminium, used for connectors of the cable conductors. Since its positioning is some instances such that not a great deal of heat can be expected to reach it, for example between the cores of a cable, it should be sufficiently soft at the relatively low temperatures around 40° C. it will in fact experience on installation of the cable joint. A composition based on a 50:50 mixture (by weight) of polyisobutylene and atactic polypropylene has been found to be particularly suitable. There is no specific requirement for this material to cure, but this would not be a disadvantage provided that good cable blocking was obtained. However, advantageously the sealing material is not rigid, thus allowing it to accommodate thermal stresses, occurring for example during load cycling of the operating cable, that result in axial movement of the cable. Although the sealing material located between the cable cores may be the same as the sealing material located around the cores, these materials can be different.

In a preferred embodiment, the sealing material in the form of a mastic has a melting point between about 91° C. and 93° C. as measured by the ring and ball (R and B) softening method, or a 50% penetration between about 50° C. and 54° C. as measured by the thermo-mechanical analysis (TMA) method. The R and B melting point should exceed the maximum operating temperature of the cable, which for a PVC insulated cable would typically be about 70 C. and for a polyethylene insulated cable would typically be about 90° C. Its viscosity advantageously has a temperature profile as given by the following table:

| Temperature °C. | 70 | 90 | 120 | 160 |
|---|---|---|---|---|
| Viscosity - Pascal sec | 1300–2500 | 450–700 | 150–220 | 50–80 |

The material should have a water absorption of <1%. The sealing material should wet out the surface of the components of the joints it contacts and should peel therefrom in a cohesive manner. That is to say, its peel strength (with respect to the joint components) should be low compared with the cohesive strength of the material itself.

Preferred examples of sealing mastic contain an EVA acid terpolymer (such as Elvax 4310 available from DuPont and comprising 24% to 27% by weight of the weight of the total composition), polyisobytylene (such as Oppanol B10, and comprising 60% to 55% of the total composition), a tackifier resin (such as Escorez 5380, and comprising 15% of the total composition), an antioxidant (such as Irganox 1010, and comprising 1% of the total composition), and a silica filler (such as Aerosil 200, and comprising 0 to 2% of the composition).

The blocking material can advantageously be a fibrous material, and may comprise synthetic or glass fibres or a mixture thereof. The material may be provided as felt in strip or sheet form. Alternatively, the blocking material may comprise a closedcell foam. Advantageously the blocking has some resilience after installation so as to enhance its conformity and contact with the cable cores. The blocking material can function solely as a physical block to prevent movement of the sealing material, and as such it need not itself seal against ingress of moisture. However, it is envisaged that the blocking material may be impregnated with a sealing material, preferably curable, so as further to restrict entry of moisture into the joint. When the blocking material is in strip or sheet form it can conveniently be inserted in one or more pieces between cable cores in regions where the cores cannot physically be prised far apart from each other.

In a further embodiment, the blocking material may itself be a sealing material, and preferably a curable material such as a hot-melt adhesive. Hot-melt adhesive used to from a seal in a cable joint is also known per se. Such material is advantageously curable, so that although its melting temperature may be less than the 95° C. operating temperature of the cables and could typically be in the range 60° to 70° C., it will physically remain in place at such temperatures due to its relatively high melt viscosity, and will thus resist any tendency of the (first) sealing material to migrate, for example under pressure from water and/or axial movement of the cable. Sealing blocking material should have a comparatively low melting point and its melting point should advantageously undergo a sharp transition, i.e. decrease, in its viscosity, in order that it will flow sufficiently well. This material may, but need not, bond to the cable insulation, since the moisture barrier is provided by the (first) sealing material. A suitable material is based on a compound of about 82% (by weight) of an acid terpolymer of ethylene, vinyl acetate (about 25% by weight of the terpolymer) and methacrylic acid, sold as ELVAX 4310, about 15% of a tackifier resin, sold as Escorez 5380, together with a curing agent, such as dicumyl peroxide, and a small amount of stabiliser.

The (first) sealing material thus provides a moisture block and the blocking material acts as a physical block for the sealing material. In an in-line joint, for example, the sealing material may be applied to each cable in the region where the cores emerge from the cable jacket and region where the cores emerge from the cable jacket (between the individual cores and around all of them), and the blocking material may extend completely therearound. In a branch joint where the or each core of the main cable is not broken, it is very difficult to prise the cores of the main cable sufficiently far apart to be able to insert the sealing material therebetween, so that this material is arranged fully to encapsulate the branch connector (which will itself completely contain the exposed portions of the cable conductors).

When the blocking material is itself a sealing material, the relative viscosities of the two sealing materials should be such that at room temperature the second (blocking) material is more viscous than the first material, and can in practice be virtually solid; at the installation temperature of the joint, for example at the recovery temperature of the outer heat-recoverable sleeve, the viscosity of the second material should fall below that of the first material, but then on cooling and crosslinking its viscosity should rise again. Consequently when in operation the cables become hot, for example exceeding the melting temperature of the second material, the melt viscosity of the second material is higher than the viscosity of the first material.

When either of the sealing and blocking materials comes into contact with more than one cable conductor or connector, then that material has to be electrically insulating, and preferably both materials, in all of the kinds of joint referred to herein, are electrically insulating.

Advantageously, the sealing and blocking materials will substantially fill the entire volume inside the protective sleeve around the cable cores and connectors. The greater part of this volume will be filled by the sealing material. Such filling enhances the mechanical strength of the joint, and also at voltages greater than about 10 kV it becomes important not to have voids that could give rise to damaging electrical discharges.

Relatively large quantities of sealing and blocking materials are required for the jointing of multi-core power cables due to their large physical size, and also for branch joints, due to the size of the branch connector, and because of this it may not be suitable to supply the sealing and blocking materials as internal coatings of a sleeve, for example the outer protective sleeve of the joints, such as a heat-recoverable sleeve, either tubular or wraparound, which is preferred for the present invention. In such a case, the materials should be applied as discrete components to the cores before the sleeve is positioned around the connection region. Typically, about 250 gms of the sealing material may be required and about 500 gms of the blocking material if this were in the form of a sealing material. In any event, the outer environmental protective sleeve, preferably a recoverable sleeve and advantageously being recoverable by the application of heat thereto, may still advantageously have a, comparatively thin, internal coating, of hot-melt adhesive for example, in order to enhance its sealing on to the cable jackets, to prevent ingress of moisture from outside the cables. It is envisaged, however, that in some circumstances, depending for example on the cut-back length of the cable jackets and thus on the volume around the connection region that has to be filled, that at least the sealing material may be provided as an inner layer of the protective sleeve. For example, with a cable cut-back length of 300 mm on a typical 1 kV cable with a branch joint, approximately 1200 grams of sealing mastic may be needed, and depending on the composition of the material it may be possible to provide this in the form of a sleeve coating. Clearly, the application of a coated sleeve is somewhat easier than having separately to apply the mastic and then the outer sleeve.

In order to input sufficient heat into these relatively large quantities of materials, and especially when that material is disposed between the cores of a cable, and taking into account the heat-sink effect of the cables referred to above, a relatively large quantity of heat must be applied to the heat-recoverable sleeve (when such a sleeve is employed). In some instances, the quantity of heat needed can harm the well-known heat-recoverable polymeric sleeves that are commonly used for cable jointing. Accordingly, it is preferred that a sleeve be used that is a polymeric fabric sleeve comprising fibres, for example glass fibres. The fibres should be arranged to follow recovery of the sleeve, and advantageously at least some, or all, of the fibres are recoverable, thus contributing to, or being responsible for recovery of the sleeve. Suitable recoverable fabric sleeves are described in, for example, the following patent publications, the entire contents of which are herein incorporated by this reference: UK-2135632B, UK-2168648B, UK-2168649B, UK-2139142B, UK-2133740B, UK-2134334B, and EP-0324630A.

The present invention is applicable to joints between low voltage (of order 1 kV) cables or high voltage ($>1$ kV, generally greater than 15 kV) cables, and to in-line joints or branch joints.

Blocked cable joints and blocking methods in accordance with the present invention will now be described by way of example with reference to the accompanying drawing, in which:

FIG. 1 shows schematically a 1 kV branch joint, and
FIG. 2 shows schematically a 1 kV in-line joint.

Referring to FIG. 1, the 1 kV branch joint comprises a four core main cable 2 having an outer insulating and protective jacket 4 and individually insulated cores 6 (only two of which are shown) each of 150 mm² cross-sectional area. The outer jacket 4 is removed at the region where the branch joint is to be made, but the cores 6 are not cut and their insulation initially remains intact. Four cores 8 (only two of which are shown) each of 50 mm² cross-section of a branch cable 10 are exposed beyond the end of its cable jacket 12. The cores 6 of the main cable 2 are carefully prised apart in the central portion of the joint, and a sausage-shaped wedge 16 of sealing mastic is inserted therebetween. Fibrous blocking material 17 in the form of felt strip is inserted in two pieces between the cores 6, so as to form a cross-shape, in the crutch region where the cores 6 emerge from the cable jacket 4 at each side of the joint region, and a further wrap of the material 17 is made around the four cores at those regions. Fibrous material 17 is similarly disposed between and around the cores 8 of the branch cable 10 where they emerge from the cable jacket 12. In each case, the free end of the outer wrap of felt can conveniently be secured by adhesive tape. The felt 17 is wrapped tightly around the cores 6,8 and is caused to fill the crutch regions therebetween so as to conform to the cores filling up any space therebetween and between the cores and the cable jackets 4,12. The cable cores are then squeezed together again. A wrap-around compact ring branch connector 14, of any suitable configuration, is clamped securely around the main cable cores 6, and the branch cable cores 8 are electrically connected thereinto (by means not shown) in conventional manner. A further quantity of sealing mastic, in the form of a tape 18 is then tightly would around the connector 14 and between and around the cores 6 and 8 adjacent thereto up to the felt 17. The material, which may or may not be the same, from which the wedge 16 and the tape 18 are formed is impervious to moisture, especially water, so that the electrically vulnerable region around the exposed conductive parts of the joint is thus completely enclosed within this material, and the cores are insulated from one another. The sealing mastic 16 and 18 is thus physically retained by the felt 17 axially of the joint thus preventing its migration, under operation of the cables, away from the connector region and especially along the cables.

Electrical interconnection between the cores 6 of the main cable 2 and the cores 8 of the branch cable 10 is then achieved, in a known manner, by tightening screws (not shown) in the connector ring 14 that pierce the insulation of the individual cores 6 whilst being insulated from each other, the screws being in electrical connection with the cores 8 of the branch cable 10.

A heat-recoverable fabric sleeve 22 that has a comparatively thin internal coating of hot-melt adhesive (not shown) is wrapped around the sealing mastic 18 and overlaps the cable jackets 4 and 12, its longitudinal edges being secured together with a closure member 24.

A three-fingered, generally planar clip 26 is applied over one end of the sleeve 22 between the main cable 2 and the branch cable 10 so as to form the sleeve 22 into a figure-of-eight configuration, holding it around each of the two cables. A suitable clip and its operation is disclosed for example in UK patent publications 1604981B, 2019120B, 1604985B, 1604986B and 2095926B. The central finger of the clip 26, which as shown is located on the inside of the outer sleeve 22 is coated with a hot-melt adhesive sealing material (not shown), which enhances the sealing of the joint.

Heat is then applied by means of a gas torch to the sleeve 22 to effect its recovery about the main and branch cables. As the sleeve 22 warms up, heat is conducted therethrough to the sealing mastic 16 and 18 and to the hot-melt adhesive on the sleeve itself and on the clip 26. The sealing materials soften, and advantageously flow as the outer sleeve shrinks radially. The recovery force of the sleeve 22 tends to urge the sealing material into close conformity with the cable cores and branch connector. The softening mastic wedge 16 and tape 18 are forced more and more into conformity with the connector 14 and the cable cores 6 and 8 and to fill the regions therebetween and therearound. Heating is terminated when the sleeve 22 has shrunk into complete comformity with the underlying components and when it is judged that the sealing material has flowed so as substantially completely to fill any voids within the sleeve. In this condition and after cooling, the mastic material 16 and 18 will have formed a moisture seal around the connector 14, and will be axially retained by the felt 17, and enclosed within the sleeve 22.

Should any water or other moisture enter the joint region from either of the cables 2 or 10 or between the cables and the sleeve 22, the mastic will prevent it entering the region around the connector 14. The felt 17 will physically hold the less viscous mastic 16, 18 in place even under high temperature (e.g. 95° C.) and pressure (e.g. 5 meters of water) operating conditions.

Referring to FIG. 2, the 1kV in-line joint is formed between two four-core cables 30,32. The cores 34,36 (only two of each being shown) are each of 150 mm² cross-section. After emerging from respective cut back cable jackets 35, 37 the cores are spread apart and pieces of felt 38 are urged into and around the respective crutch regions therebetween in analogous manner to that described with reference to FIG. 1. Corresponding exposed conductors of the cables 30,32 are electrically and mechanically connected together by crimps 40. A water-impervious mastic tape 43 is wound around each of the four cores of each cable at a region spaced apart from the end of the cable jackets, and a cross-shaped insulating spacer 42 is inserted between the cores so as further to insulate the crimps 40 from each other. Further tape 43 is wound around the spacer 42 and around the internally located mastic 43 to complete the water block at that region. The tape 43 extends longitudinally so as to fill the region between the felt strips 38 at each end. Finally, a tubular heat recoverable fabric sleeve 46 internally coated with a thin layer of hot-melt adhesive, which had been slid along one of the cables 30,32 before beginning the joint, is positioned over the mastic 43, and may advantageously overlap the cable jackets 35,37.

As described with reference to FIG. 1, heat is applied to the sleeve 46 to effect its recovery and to cause the mastic 43 to soften, conform and seal around the crimp region. The felt 38 will prevent migration of the mastic 43 along the cables 30,32.

Although as shown in FIGS. 1 and 2, sufficient water blocking of the joint is obtained by having blocks only longitudinally each side of the sealing material, it is envisaged that in some instances the mastic sealing material is completely enclosed by the blocking material.

Advantageously, the protective sleeve itself forms a seal, preferably against moisture, on to the cable jackets and on to the blocking material.

We claim:

1. A joint between electric power cables in which at least two cable cores are exposed beyond the end of outer jackets of at least two cables and in which conductors of the two cores are electrically connected to each other, wherein sealing material selected from the group consisting of mastic and heat melt adhesive and which is substantially impervious to moisture is located around the two cores so as to prevent any moisture reaching the electrical connections of the conductors; wherein blocking material is located within the joint in the crutch region of each cable core where the cores emerge from the respective jackets so as to prevent the sealing material from migrating away from the connections along the cables within each respective jacket; a heat recoverable protective sleeve encloses the electrical connections and the sealing and blocking materials, and wherein the blocking material is selected from the group consisting of a fibrous material, a closed-cell foam, felt, glass fibers and synthetic fibrous material.

2. A cable joint according to claim 1, wherein the sealing material encapsulates the electrical connections between the cables.

3. A cable according to claim 1, wherein the blocking material encapsulates the sealing material.

4. A cable joint according to claim 1, comprising at least one connector arranged electrically to interconnect the cores of the cables, wherein the sealing material encapsulates the or each connector.

5. A cable according to claim 1, wherein the blocking material completely encloses each cable at the region where the cores are exposed beyond the outer jackets.

6. A cable joint according to claim 1, wherein the blocking material extends over each cable jacket.

7. A cable joint according to claim 1, wherein the sealing material comprises a hot-melt adhesive.

8. A cable joint according to claims 2, wherein the blocking material comprises a sealant.

9. A cable joint according to claim 8, wherein the sealant is curable, preferably being a hot-melt adhesive.

10. A cable joint according to claim 1, wherein the protective sleeve is bonded, preferably by hot-melt adhesive, on to the cable jackets.

11. A cable joint according to claim 1, wherein the sleeve comprises a polymeric material having fibres embedded therein.

12. A cable joint according to claim 1, wherein the sealing material is provided as an inner layer of the protective sleeve.

13. A method of forming a moisture-blocked joint between at least two electric power cables; comprising the steps of removing outer jackets of the cables to expose the cores for access to the conductors thereof; making electrical connection between the conductors of the cables; disposing sealing material that is selected from the group consisting of mastic and heat melt adhesive and which is substantially impervious to moisture around the cable cores so as to present any moisture reaching the electrical connections; locating blocking material within the joint in the crutch region of each cable core where the core emerges from the respective jacket so as to prevent the sealing material from migrating away from the connections along the cores within each respective jacket; and positioning a heat recoverable protective sleeve around the electrical connections so as to enclose the cable connections and the sealing and blocking materials.

14. A method according to claim 13, wherein the sealing material is applied so as completely to enclose the electrical connections between the cables.

15. A method according to claim 13, wherein the blocking material is positioned between and around the cores so as completely to enclose each cable at the region where the cores are exposed beyond the outer jackets.

16. A method according to claim 13, wherein the protective sleeve comprises a recoverable sleeve of polymeric material having fibres embedded therein, and is recovered around the cable joint, preferably being sealed on to the cable jackets.

* * * * *